United States Patent
Bao et al.

(10) Patent No.: US 10,504,244 B2
(45) Date of Patent: Dec. 10, 2019

(54) SYSTEMS AND METHODS TO IMPROVE CAMERA INTRINSIC PARAMETER CALIBRATION

(71) Applicant: Baidu USA, LLC, Sunnyvale, CA (US)

(72) Inventors: Yingze Bao, Mountain View, CA (US); Mingyu Chen, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 16/102,644

(22) Filed: Aug. 13, 2018

(65) Prior Publication Data

US 2019/0096091 A1 Mar. 28, 2019

Related U.S. Application Data

(60) Provisional application No. 62/564,882, filed on Sep. 28, 2017.

(51) Int. Cl.
*G06T 7/00* (2017.01)
*G06T 7/80* (2017.01)
*G06T 7/11* (2017.01)

(52) U.S. Cl.
CPC .......... *G06T 7/85* (2017.01); *G06T 7/11* (2017.01); *G06T 2207/20021* (2013.01); *G06T 2207/30204* (2013.01); *G06T 2207/30208* (2013.01)

(58) Field of Classification Search
CPC .... G06T 7/85; G06T 7/11; G06T 2207/30204
See application file for complete search history.

(56) References Cited

U.S. PATENT DOCUMENTS 9,282,326 B2  3/2016  Olson et al.
2007/0253618 A1* 11/2007 Kim .................... G06T 7/80
                                                    382/154

(Continued)

OTHER PUBLICATIONS

Zhengyou Zhang, "A Flexible New Technique for Camera Calibration," Microsoft Research, Dec. 1998, [Online], [Retrieved Sep. 8, 2017]. Retrieved from Internet <URL: https://www.microsoft.com/en-us/research/wp-content/uploads/2016/02/tr98-71.pdf> (22 pgs).

(Continued)

*Primary Examiner* — Zhihan Zhou
(74) *Attorney, Agent, or Firm* — North Weber & Baugh LLP

(57) ABSTRACT

Described herein are systems and methods that provide easy and effective camera calibration. In one or more embodiments, a set of calibration patterns, such as array of unique markers, are used as a calibration target. The unique calibration markers resolve ambiguity when only partial views of the calibration target are captured. Embodiments disclosed herein also allow for an interactive calibration process that can direct users to specific locations within the camera image that require additional calibration image captures. Also, in one or more embodiments, the calibration process may be checked at one or more stages to help insure that the final camera intrinsic parameters will be sufficiently accuracy. One of the verifications may include addressing overfitting by, for example, using a first subset of the captured images to compute the intrinsic parameters and using a second set of the captured images to verify those intrinsic parameters.

20 Claims, 12 Drawing Sheets

(56) References Cited

U.S. PATENT DOCUMENTS

| | | | | |
|---|---|---|---|---|
| 2010/0245541 | A1* | 9/2010 | Zhao | G01D 1/00 348/45 |
| 2013/0265443 | A1* | 10/2013 | Jin | H04N 5/232 348/187 |
| 2015/0178927 | A1* | 6/2015 | Olszamowski | G06T 7/73 382/103 |
| 2015/0317802 | A1* | 11/2015 | Jin | H04N 5/232 348/42 |
| 2018/0268237 | A1* | 9/2018 | Stanimirovic | G06K 9/2018 |
| 2018/0315221 | A1* | 11/2018 | Jones | G06T 11/005 |

OTHER PUBLICATIONS

Zhengyou Zhang,"A Flexible New Technique for Camera Calibration," Sung Huh, CSPS 643 Individual Presentation I, Feb. 25, 2009 (40 pgs).

\* cited by examiner

|   |   |   |
|---|---|---|
| 1 | 2 | 3 |
| 4 | 5 | 6 |
| 7 | 8 | 9 |

700

|   |   |   |
|---|---|---|
| 1 | | |
| 2 | 3 | 4 |
| 5 | | |

SYSTEMS AND METHODS TO IMPROVE CAMERA INTRINSIC PARAMETER CALIBRATION

CROSS-REFERENCE TO RELATED APPLICATION

This application claims the priority benefit under 35 USC § 119(e) to U.S. Provisional Patent Application No. 62/564,882, filed on 28 Sep. 2017, entitled "SYSTEMS AND METHODS TO IMPROVE CAMERA INTRINSIC PARAMETER CALIBRATION," and listing Yingze Bao and Mingyu Chen as inventors. The aforementioned patent document is incorporated by reference herein in its entirety.

BACKGROUND

A. Technical Field

The present disclosure relates generally to systems and methods for improving image processing, and more particularly for improving camera calibration.

B. Background

Camera calibration is an integral part of imaging systems. A camera, like any type of sensor or measurement system, requires correct initial calibration for the captured results to be useful. Accordingly, an important part of an imaging system is to perform calibration. A typical calibration activity for imaging systems is to obtain the camera's intrinsic parameters. Obtaining these parameters is important for several computer vision tasks, such as three-dimensional reconstruction, structure from motion, visual simultaneous location and mapping (SLAM), depth reconstruction, and the like. The accuracy of camera intrinsic parameters highly affects the quality of the results of these tasks.

Due to variations and limitations on the manufacture and assembly processes, there are always differences between camera. For example, camera components, such as the lens and camera sensors can vary both in their responses and in physical installation within the camera. As a result, the intrinsic parameters are different for every camera. Thus, camera intrinsic parameter calibration is an important process for cameras.

The calibration of camera intrinsic parameters first requires collecting a number of images that usually contains a calibration pattern (e.g., a checkerboard). The calibration process then involves performing a computational process to analyze the images to estimate the intrinsic parameters for the specific camera that captured in the images.

The complexity involved in current calibration methods make configuring imaging systems difficult, time-consuming, and expensive. These problems also make it difficult for lay users to calibrate vision systems.

Accordingly, systems and methods are needed that provide simple, robust, accurate, and fast camera calibration.

BRIEF DESCRIPTION OF THE DRAWINGS

References will be made to embodiments of the inventions, examples of which may be illustrated in the accompanying figures. These figures are intended to be illustrative, not limiting. Although the inventions are generally described in the context of these embodiments, it should be understood that it is not intended to limit the scope of the inventions to these particular embodiments. Items in the figures may not be to scale.

FIG. 7 depicts example image pattern regions, according to embodiments of the present document.

DETAILED DESCRIPTION OF EMBODIMENTS

Figure 1:
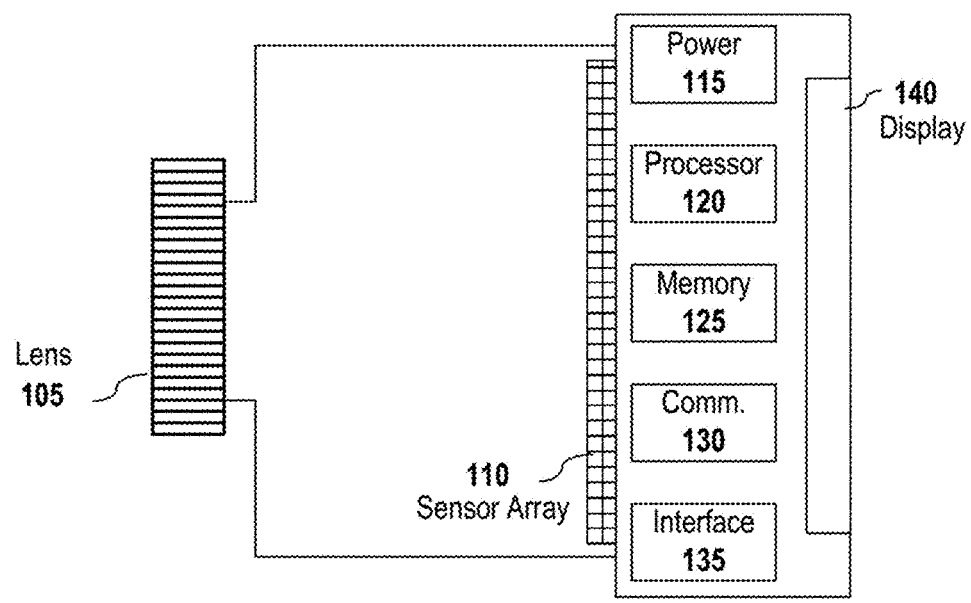
FIG. 1 depicts an example camera system, according to embodiments of the present document.

In the following description, for purposes of explanation, specific details are set forth in order to provide an understanding of the inventions. It will be apparent, however, to one skilled in the art that the inventions can be practiced without these details. Furthermore, one skilled in the art will recognize that embodiments of the present inventions, described below, may be implemented in a variety of ways, such as a process, an apparatus, a system, a device, or a method on a tangible computer-readable medium.

Components, or modules, shown in diagrams are illustrative of exemplary embodiments of the inventions and are meant to avoid obscuring the inventions. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. It shall also be understood that the terms "image" or "images" as used herein shall mean still images, video images, or both.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. General Overview

As noted above, camera calibration is an important part of configuring a camera. Camera calibration has been studied for several years, and a substantial body of work for calibrating imaging systems exists. One method commonly known and commonly used to calibrate a camera is described by Zhengyou Zhang in "A Flexible New Technique for Camera Calibration," IEEE Transactions on Pattern Analysis and Machine Intelligence, 22(11): 1330-1334 (2000), which is herein incorporated in its entirety by reference. In this method, several images of a flat, checkerboard pattern target that forms feature points are captured by the camera which is to be calibrated. To calibrate the camera, the target is posed at a variety of angles and positions relative to the camera. The image locations of feature points are extracted, and since the relative location of each feature point is known, the captured feature point locations can be used to calibrate the camera. When two or more cameras are present in the system, the intrinsic parameters as well as the geometric relationship between all cameras can be estimated by having all cameras capture an image of the flat object at each pose angle.

While this methodology helps with calibrating a camera, this technique tends to suffer from at least a few drawbacks. First, the prior methodology does not explain how to place the calibration pattern in front of a camera. There remains great difficulty associated with the process of collecting images, where either the camera or the calibration pattern should be moved so that the location, scale, and/or angle of the calibration pattern changes in different camera images. Because the image capture process is less certain, the quality of the results of a calibration process usually varies. Therefore, to obtain a set of good calibration parameters, multiple trials are typically performed for a single camera.

Second, there is ambiguity in identifying the checker number in the checkboard target if the checkerboard is not fully visible in the captured image. This condition is particularly problematic when trying to detect enough feature points near an edge of the image frame because if the checkerboard is moved to a corner or a side area of the camera view, the checkerboard is likely to be only partially visible. Thus, the quality of the calibration is usually very low at the sides and corner areas in the camera view.

Finally, since all the captured images are used for the camera parameters computation process, data overfitting problems can be very severe, and outlier data samples may significantly hurt the results.

Others have attempted to address one or more of these drawbacks. For example, some have proposed interactive calibration processes or using different calibration targets that are easier to identify feature points. However, even these approaches require carefully design of the interactive process and also do not address all of the drawback presented above.

Embodiments presented herein provide systems and methods that overcome the drawbacks noted above and provide an easy and effective process by which to calibrate a camera system.

In one or more embodiments, a set of calibration patterns, such as array of unique markers, are used as a calibration target. The unique calibration patterns resolve ambiguity issues when only partial views of the calibration target are captured. Furthermore, this feature also allows the calibration target to be moved to a side and/or corner in the image frame/camera view, which thereby allows for a full coverage of the camera view by accumulating the views of at least portions of the calibration target in different captured images.

The systems and methods disclosed herein allow for an interactive calibration process that prompts users, when necessary, for specific locations within the camera image that require additional calibration image captures. In one or more embodiments, prompts to users for specific regions of the camera view to receive more captured images of calibration patterns can be facilitated by dividing the image frame into a number of region and checking that a sufficient number of calibration pattern have been detected in each region. Such a process may be made universal to all cameras, and thereby can promote repeatability of the calibration process.

Also, in one or more embodiments, the systems and methods can verify at one or more stages during the calibration process that the camera intrinsic parameters achieve a sufficient level of accuracy. One of the verification processes can, in one or more embodiments, include addressing overfitting issues by, for example, using a first selected subset of calibration images to compute intrinsic parameters and using a second set of images to verify the results.

B. System Embodiments

1. Camera System Embodiments

FIG. 1 depicts an example camera system or imaging device 100 according to embodiments of the present disclosure. The camera 100 comprises one or more lens 105 for focusing an image onto an image sensor array 110. The image sensor array 110 may be a semiconductor device, such as a charge coupled device (CCD) sensor array or complementary metal oxide semiconductor (CMOS) sensor array, or other sensor device or devices for capturing images. In one or more embodiments, the image sensor array 110 is communicatively coupled to a processor 120 (which may be one or more integrated circuits, application specific integrated circuit(s), and/or system(s) on a chip) for processing the image captured by image sensor array. In one or more embodiments, the camera may also comprise addition components, including but not limited to a power source 115, one or more permanent and/or removable memories or storage device 125 for use by the processor to store data temporarily, permanently, or both, one or more communications modules 130 to support communications (wired, wireless, or both) to one or more other devices, a display 140 for displaying images and/or menu items to a user, and an interface module or modules 135 for receiving input from a user via one or more button and/or via display 140, if the display is a touch-sensitive display. One skilled in the art shall recognize that camera system 100 may include additional items, such as image encoders and other items, which are not depicted in FIG. 1. The example imaging device 100 is presented to help elucidate aspects the present inventions; for that reason, it should be noted that no particular camera system is critical. Indeed, one skilled in the art will recognize that any imaging device, including a non-digital imaging device in which the captured image has been digitized, may be used. Furthermore, embodiments of the present inventions may be utilized with any device that incorporates an imaging device, including, but not limited to, digital cameras, video cameras, mobile phones, computers, and the like.

2. Computing System Embodiments

In one or more embodiments, aspects of the present inventions may utilize, may include, or may be implemented on one or more information handling systems/computing systems, which may be used with or incorporated into or with a camera system 100. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 2:
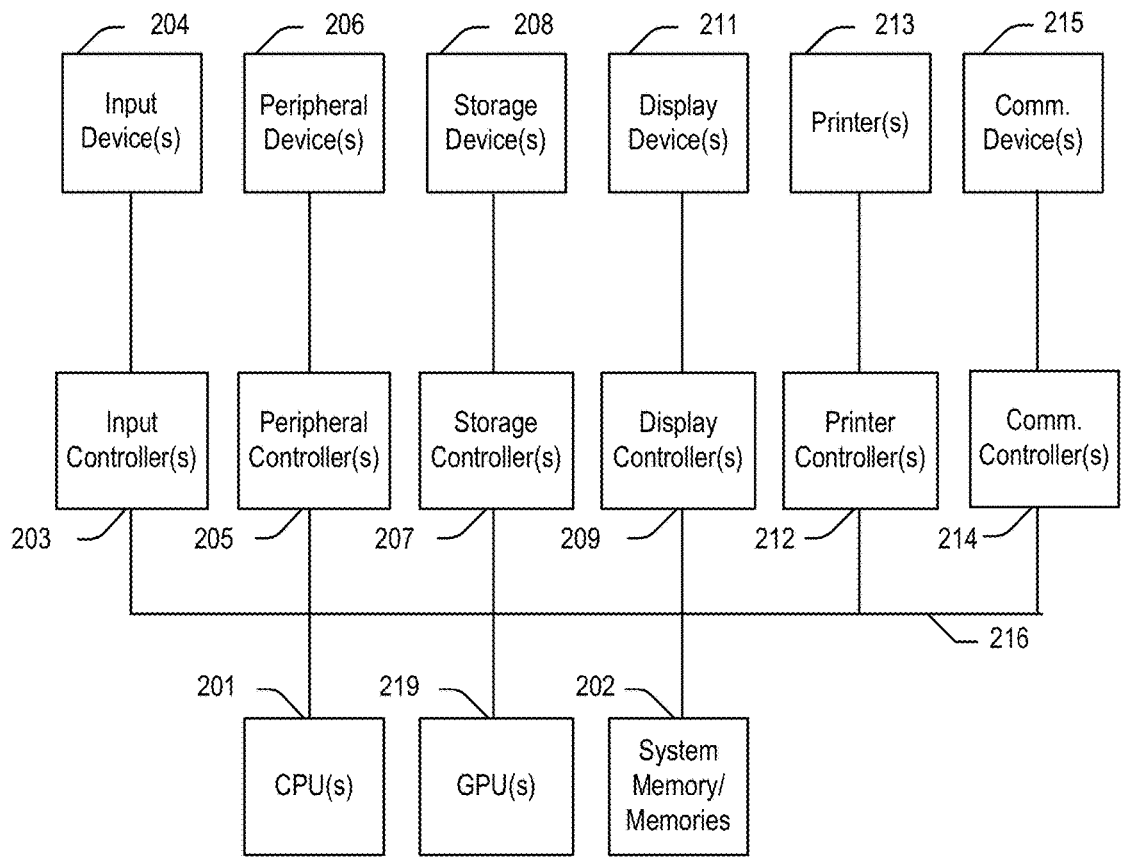
FIG. 2 depicts a simplified block diagram of a computing device/information handling system, in accordance with embodiments of the present document.

FIG. 2 depicts a simplified block diagram of a computing device/information handling system (or computing system) according to embodiments of the present disclosure. It will be understood that the functionalities shown for system 200 may operate to support various embodiments of a computing system—although it shall be understood that a computing device may be differently configured and include different components, including fewer or more components depicted in FIG. 2.

As illustrated in FIG. 2, the computing system 200 includes one or more central processing units (CPU) 201 that provides computing resources and controls the computer. CPU 201 may be implemented with a microprocessor or the like, and may also include one or more graphics processing units (GPU) 219 and/or a floating-point coprocessor for mathematical computations. System 200 may also include a system memory 202, which may be in the form of random-access memory (RAM), read-only memory (ROM), or both.

A number of controllers and peripheral devices may also be provided, as shown in FIG. 2. An input controller 203 represents an interface to various input device(s) 204, such as a keyboard, mouse, touchscreen, and/or stylus. There may also be a scanner controller (not shown), which communicates with a scanner (not shown), which may be used to received scanned images. The system 200 may also include a storage controller 207 for interfacing with one or more storage devices 208, each of which includes a storage medium, such as magnetic tape or disk, or an optical medium that might be used to record programs of instructions for operating systems, utilities, and applications, which may include embodiments of programs that implement various aspects of the present inventions. Storage device(s) 208 may also be used to store processed data or data to be processed in accordance with the inventions. The system 200 may also include a display controller 209 for providing an interface to a display device 211, which may be a cathode ray tube (CRT), a thin film transistor (TFT) display, organic light-emitting diode, electroluminescent panel, plasma panel, or other type of display. The computing system 200 may also include one or more peripheral controllers or interfaces 205 for one or more peripherals 206. The peripherals may include one or more printers, mobility system (which may include one or more motors, servo units, etc.), inertial measurement units, vision systems (which may include one or more cameras), sensors, etc. A communications controller 214 may interface with one or more communication devices 215, which enables the system 200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 216, which may represent more than one physical bus. However, various system components may or may not be in physical proximity to one another. For example, input data and/or output data may be remotely transmitted from one physical location to another. In addition, programs that implement various aspects presented herein may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present inventions may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present inventions may further relate to computer products with a non-transitory, tangible computer-readable medium that have computer code thereon for performing various computer-implemented operations. The media and computer code may be those specially designed and constructed for the purposes of the present inventions, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present inventions may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present inventions. One skilled in the art will also recognize that a number of the elements described above may be physically and/or functionally separated into sub-modules or combined together.

3. Camera Calibration Method and System Embodiments

Figure 3:
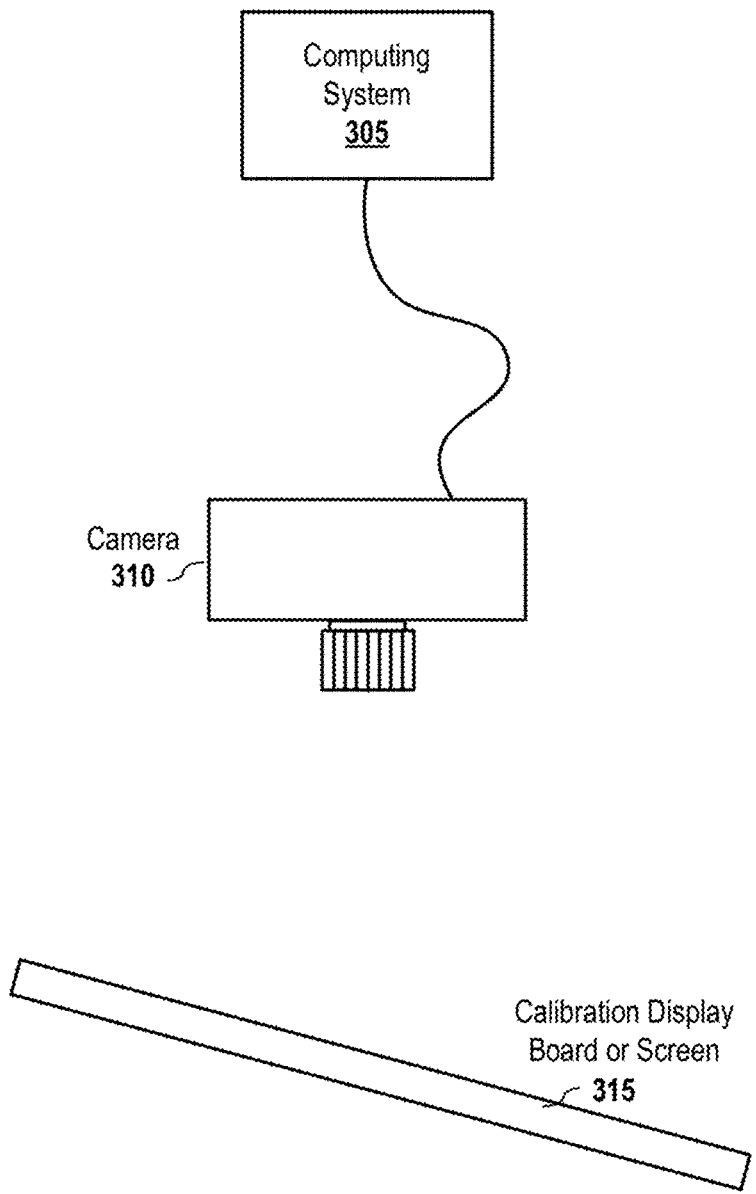
FIG. 3 depicts a camera calibration system, according to embodiments of the present document.

FIG. 3 depicts a camera calibration system, according to embodiments of the present document. As shown in FIG. 3, the system comprising a computing system 305, which may be one like that described with respect to FIG. 2, and a camera 310, which may be one like that described with respect to FIG. 1. As noted above, while the computing system 305 and the camera 310 are depicted as separate devices, they may be integrated into a single device.

In one or more embodiments, the camera calibration system 300 may include one or more cameras, which may take video images, still images, or both. Images may be captured from different angles and may be captured simultaneously, sequential, or both. Such systems are well known to those of ordinary skill in the art, and any of a variety of such systems may be used. As is also well known to those of ordinary skill in the art, the captured images are used to help determine the calibration parameters of the camera of the system.

Also depicted in FIG. 3 is a calibration target 315, which may comprise a plurality of a calibration patterns. In one or more embodiments, the calibration target 315 may be a physical board or may be a display. In one or more embodiments, some or all of the calibration patterns in the calibration target may comprise a unique pattern, making each such calibration pattern unambiguously identifiable in a captured image. As noted above, when using a simple checkerboard calibration target, ambiguity can exist when trying to identify a checker in the checkboard target—especially if the entire checkerboard is not fully visible in the captured image. Thus, the calibration target condition is particularly problematic when trying to detect enough feature points near an edge of the image frame because if the checkerboard is moved to a corner or a side area of the camera view, the checkerboard is likely to be only partially visible.

Figure 4:
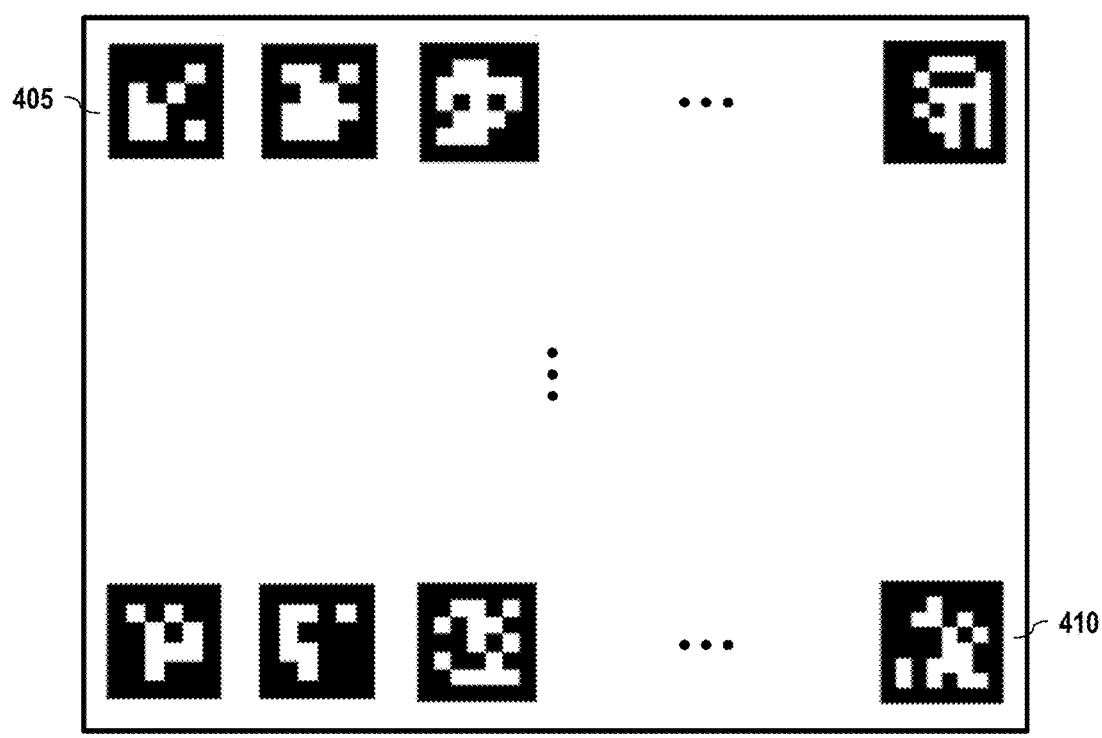
FIG. 4 depicts an example calibration target comprising a set of calibration patterns, according to embodiments of the present document.

FIG. 4 depicts an example calibration target 400 comprising a set of calibration patterns (e.g., 405 and 410), according to embodiments of the present document. In one or more embodiments, the calibration patterns of the calibration target may be a two-dimensional code, for example, ARUCO, artoolkit, AprilTag, QR codes, etc. An array of these unique calibration patterns (or markers) may be printed on or applied to a flat structure to form the calibration target 400. It should be noted that the calibration markers may be in a grid array (such as 5×6 array of markers), although they may comprise different numbers of markers and may be displayed or arranged in different configurations.

Figure 5:
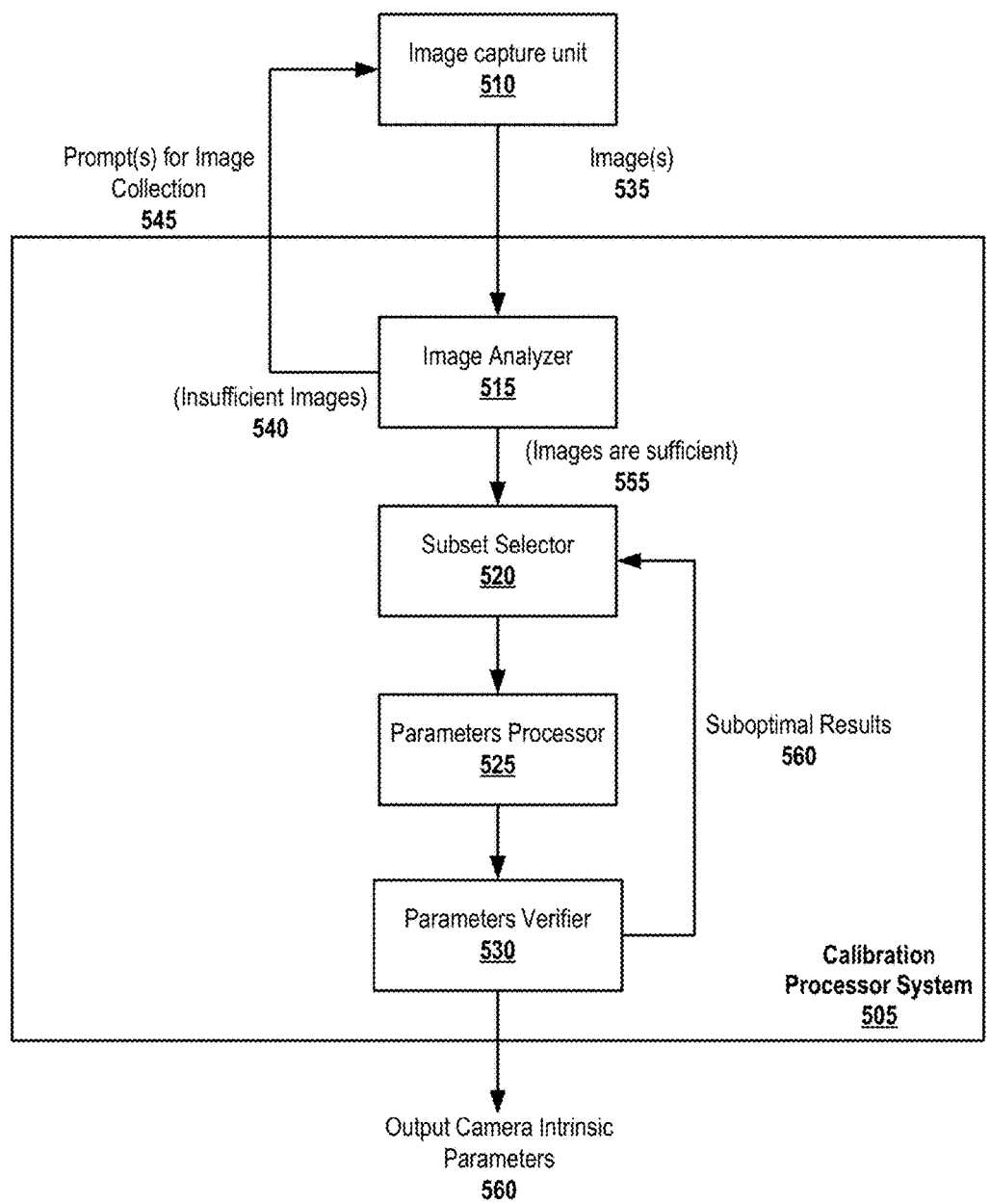
FIG. 5 includes a depiction of a calibration processor that can be used to help calibrate a camera, according to embodiments of the present document.

Turning now to FIG. 5, depicted is a calibration processor system 505, whose components may be part of a camera (e.g., camera 100 of FIG. 1, camera 310 of FIG. 3), part of a computing system (e.g., computing system 305 of FIG. 3), or split between a camera and computing system (e.g., computing system 305 and camera 310 of FIG. 3).

As illustrated in FIG. 5, the processor system 505 comprises: an image analyzer 515 that detects image features points have been detected in the image and determines whether a sufficient number and coverage of image features points, a subset selector 520 that selects a subset of the captured images to be used to estimate the camera parameters, a parameters processor 525 that uses the detected features points in the selected subset of images to estimate the camera parameters, and a parameters verifier 530 that checks the accuracy of the estimated camera parameters. Also depicted in FIG. 5 is a camera or image capture unit 510 that captures images of the calibration target and supplies them to the calibration processor system 505. It should be noted that system 505 may include additional components, which are not depicted here to avoid obscuring aspects of the present inventions.

While FIG. 5 provides a general overview of components of the calibration processor system 505, the functionality of the components, as well as their overall interactions, are described in more detail below with respect to FIGS. 6-12.

a) Image Analyzer Embodiments

Figure 6:
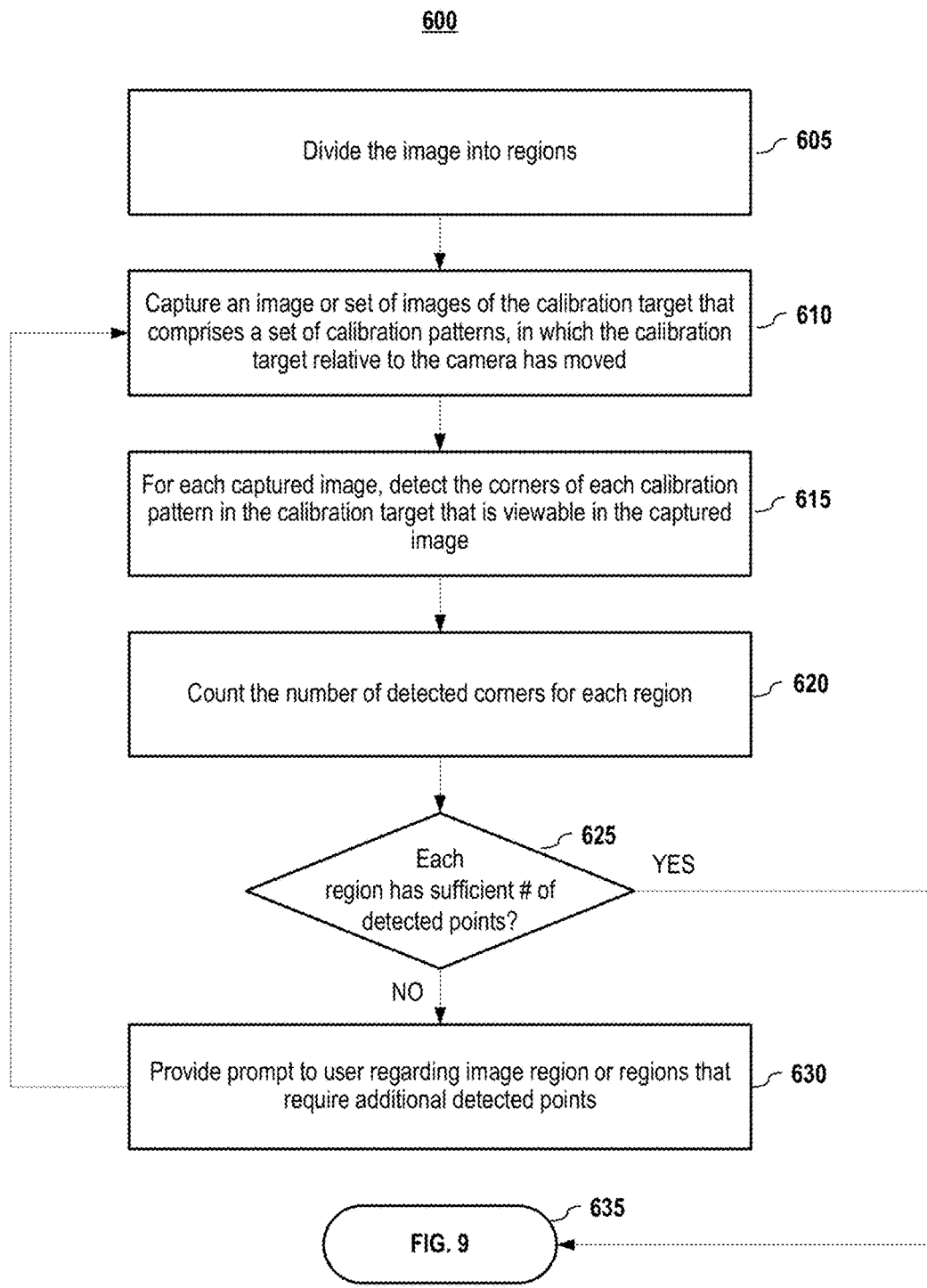
FIG. 6 depicts a method which may be performed, at least in part, by an image analyzer, according to embodiments of the present document.

FIG. 6 depicts a method which may be performed, at least in part, by an image analyzer 515, according to embodiments of the present document. In one or more embodiments, a user may initially start the process by turning on the camera 510 and positioning it and the calibration target (which has a set of unique calibration patterns or markers) so that the camera can capture a view of at least a portion of the calibration target. In one or more embodiments, using a preview mode or display of the camera, a user may initially position the calibration target in the center of the image frame. A set of captured images 535 of the calibration target, which may be taken at different positions, angles, and/or locations are captured and supplied to image analyzer 515 of the calibration system 505.

Figure 7:
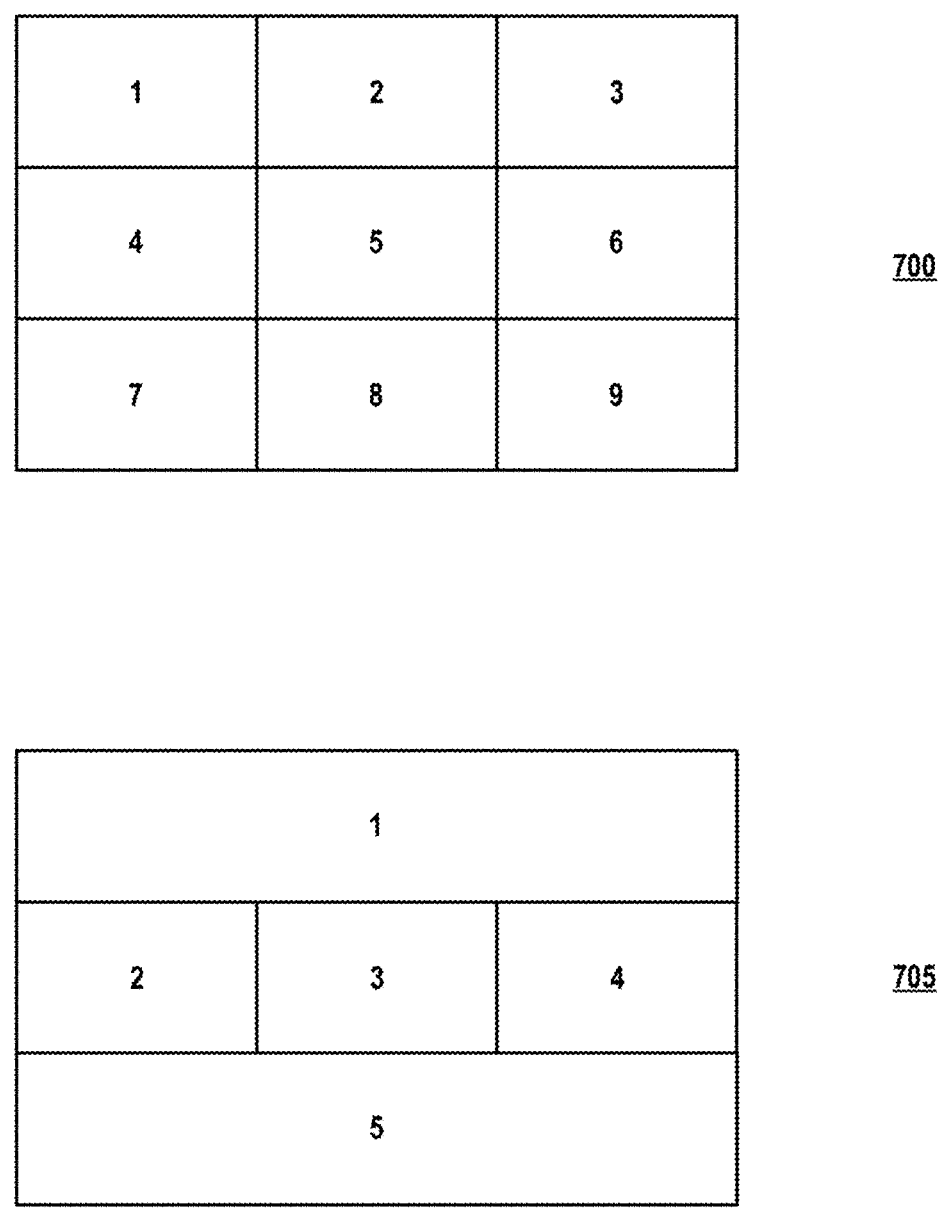

In one or more embodiments, the image analyzer 515 divides (605) the image frame of the camera into regions. FIG. 7 depicts example image pattern regions, according to embodiments of the present document. The first example pattern 700 is a 3×3 grid. It should be noted that the pattern for the regions need not be regular in size or distribution nor need they be uniform. For example, the second example pattern 705 comprises two longer regions (regions 1 and 5) on top and bottom and more regions dividing the middle portion. The image frame may be divided with more regions in areas of the image frame that require more accuracy for the camera calibration, such as area of primary focus of the user's attention. In one or more embodiments, each region may be assigned a unique identifier.

Returning to FIG. 6, an image (or a set of images) of the calibration target is captured (610). In one or more embodiments, the calibration target and/or the camera may be moved to capture different images to provide calibration pattern coverage across the image frame. For each captured image, the corners or other feature points of each calibration marker of the calibration target that is viewable in the captured image are detected (615). One skilled in the art shall recognize that a number of different corner feature detectors or feature detectors may be employed to detect the features. For example, if AprilTags are used, the detection tools available at april.eecs.umich.edu/software/aprilt-ag.html (which content is incorporated by reference herein in its entirety) and www.hitl.washington.edu/artoolkit/ (which content is incorporated by reference herein in its entirety) may be used.

In one or more embodiments, the image analyzer counts (620) the number of detected features (e.g., corners or other feature points) for each region of the image frame. If one or more of the regions do not contain (625) a sufficient number of detected features (e.g., 100 features), the user may be provided (630) with a prompt informing him or her that a particular region or regions requires additional detected features.

In one or more embodiments, a check of each region may include whether the detected points cover the full camera view. For example, in one or more embodiments, the maximum gap between a boundary of the image frame and the detected points and/or the maximum gap between points may be determined. If a gap it too large, the user may be prompted to capture more feature points in the affect area.

The prompt to the user may identify the region by its unique identifier, and in one or more embodiments, may also indicate how many more detected features are required. For example, assuming the grid region 700 of FIG. 7 and assuming that it was deficient by 18 feature points, the system prompt may be "Region 4 requires at least 18 more detected feature points."

Figure 8:
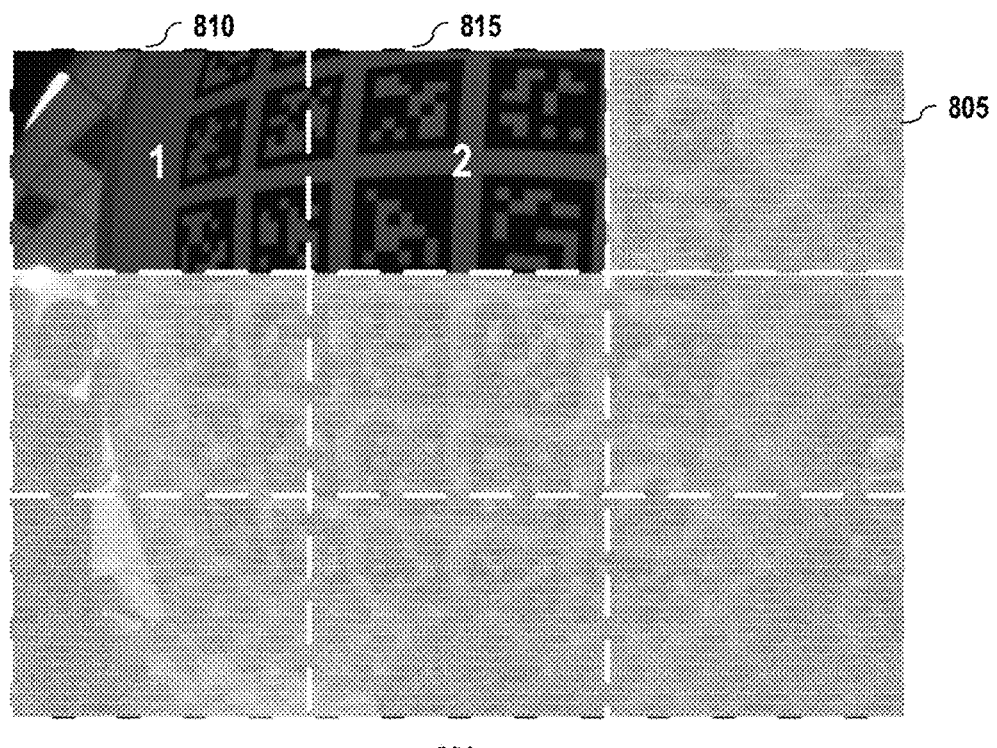
FIG. 8 depicts example prompts for a user to assist in calibration pattern capture, according to embodiments of the present document.
Figure 8:
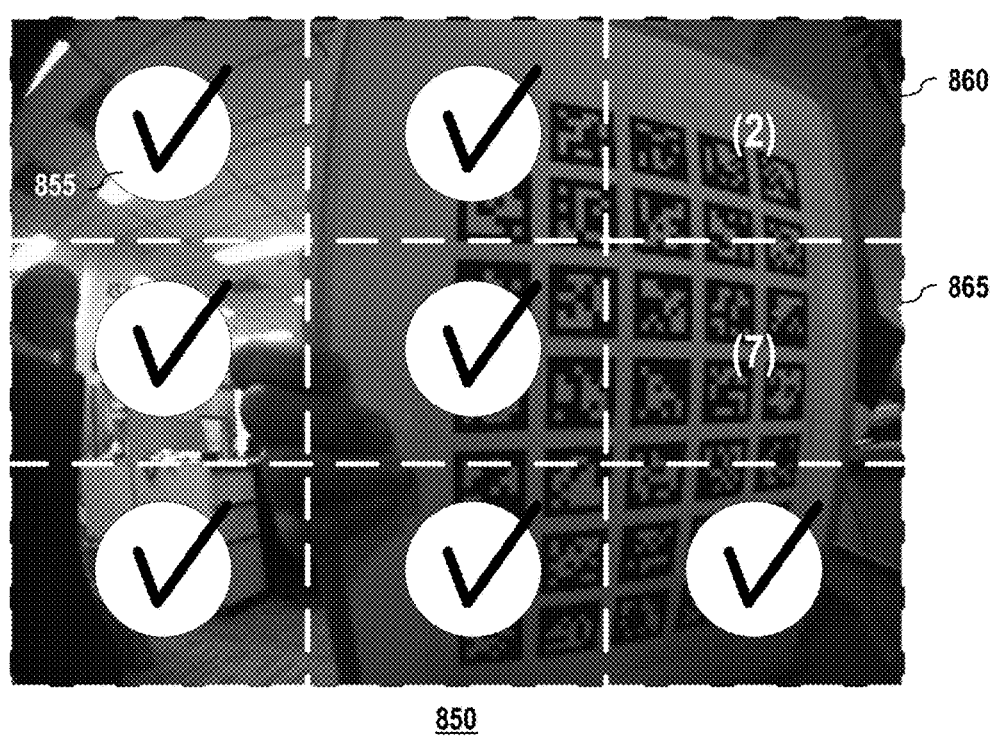

One skilled in the art shall recognize that other prompts, including visual prompts may also be used. In one or more embodiments, these prompts may be provided via the camera, via a computing system (e.g., computing system 305) or a combination thereof. In one or more embodiments, a user may be allowed turn the visual prompts on and off. FIG. 8 depicts example prompts for a user to assist in calibration pattern capture, according to embodiments of the present document.

In the first depicted example, the prompt 800 comprises a real-time view of what the camera is viewing plus an overlay that masks or at least partially obscures (e.g., 805) the regions that have a sufficient number of detected features. In the depicted example, the regions that do not have a sufficient number of detected features are not masked (e.g., Regions 1 (810) and 2 (815)). By not masking the regions that need more images, the user can easily view the placement of the calibration target to make sure that calibration patterns are viewable in those regions.

In the second depicted example, the prompt 850 comprises a real-time view of what the camera is viewing plus an indicator that identifies regions that have a sufficient number of detected features and an indicator that identifies regions that do not. In the depicted example, the regions that have a sufficient number of detected features are identified with a checkmark 855—thereby indicating that no additional feature points need to be detected for that region. In the depicted example, the regions that do not have a sufficient number of detected features have no positive indication (i.e., no checkmark). In one or more embodiments, such regions may also include an indicator of how many more features should be detected. In the depicted example, the top right region 860 requires 2 more feature points to be detected and the other region 865 requires 7 more feature points to be detected.

Image capture and feature point detection may continue until each region has enough detected points (625). In one or more embodiments, the image analyzer may also check that the number of captured images exceeds a threshold (e.g., 30 images). When the image capture process is sufficient, the overall methodology may proceed to engage (635) the subset selector 520. An example method embodiment that may be employed by the image subset selector 520 is depicted in FIG. 9.

b) Image Subset Selector Embodiments

Figure 9:
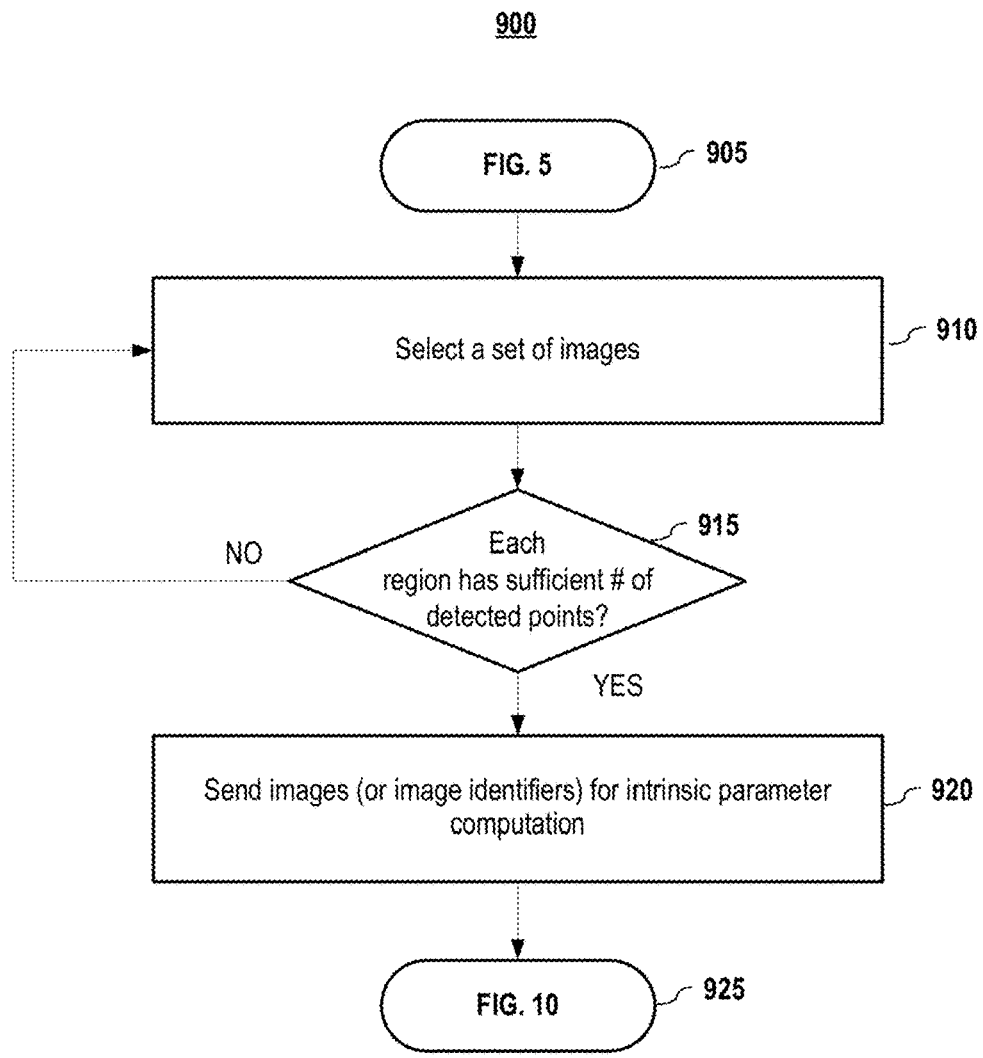
FIG. 9 depicts another method which may be performed, at least in part, by a subset selector, according to embodiments of the current disclosure.

FIG. 9 depicts another method which may be performed, at least in part, by a subset selector, according to embodiments of the current disclosure. In one or more embodiments, the image subset selector 520 selects (910) a set of images (e.g., 20 images) from the set of captured images. In one or more embodiments, the images may be selected at random.

In one or more embodiments, the subset selector 520 checks (915) if each region of the image frame has a number of detected features that exceeds a subset detected features threshold, which may be the same as the other detected features threshold (e.g., 100 features) or may be less than that amount. If there is not a sufficient number of detected features in one or more regions, the subset selector may re-try selecting a set of images (e.g., return to step 910). Alternatively, the subset selector may supplement the existing set of selected images by randomly selecting additional images.

If the set of selected images contains enough detected features in each region of the image frame, the images (or the image identifiers) are provided to the parameters processor 525 to estimate the intrinsic parameters for the camera. An example method embodiment that may be employed by the parameters processor 525 is depicted in FIG. 10.

c) Parameters Processor Embodiments

Figure 10:
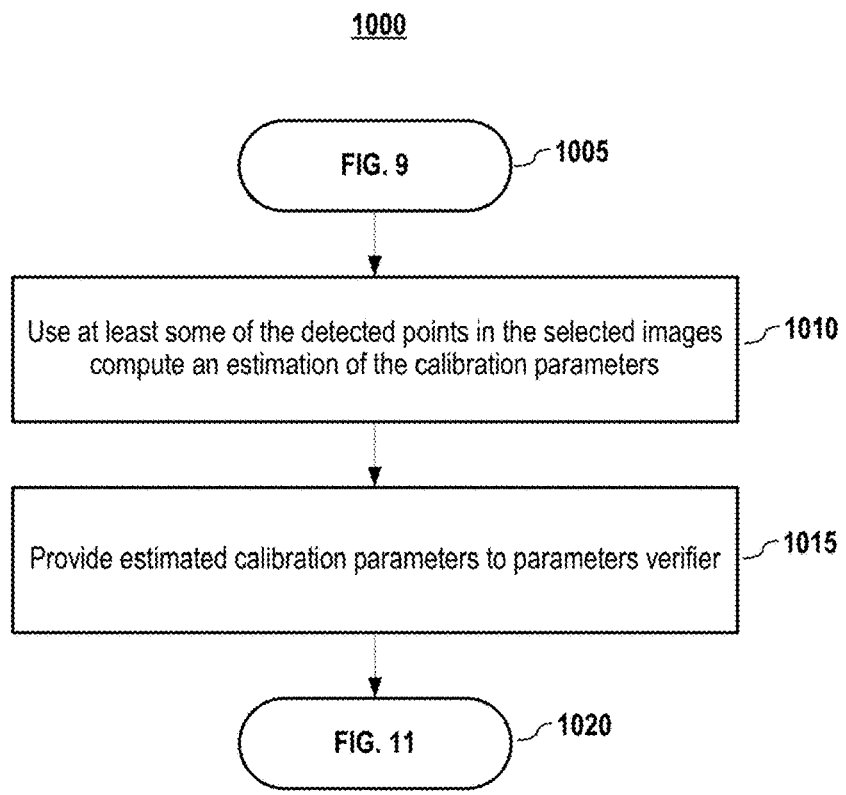
FIG. 10 depicts a method which may be performed, at least in part, by an intrinsic parameters processor, according to embodiments of the present disclosure.

FIG. 10 depicts a method which may be performed, at least in part, by an intrinsic parameters processor, according to embodiments of the present disclosure. In one or more embodiments, using at least some of the detected points from the set of selected images, the calibration parameters are estimated (1010) and may be represented as:

$$K = \begin{bmatrix} \alpha & \gamma & u_0 \\ 0 & \beta & v_0 \\ 0 & 0 & 1 \end{bmatrix},$$

where
($u_0$, $v_0$) represent the coordinates of the principal point of the image;
$\alpha$ and $\beta$ represent scale factors in image u and v axes; and
$\gamma$ represents the parameter describing the skewness of the two image axes.

In one or more embodiments, distortion parameters, such as radical distortion model parameters and/or fisheye distortion model parameters, may also be computed and may also be considered intrinsic camera parameters herein.

As mentioned previously, the camera intrinsic parameters may be computed using the method discussed in by Zhengyou Zhang in "A flexible New Technique for Camera Calibration," IEEE Transactions on Pattern Analysis and Machine Intelligence, 22(11): 1330-1334 (2000), which is herein incorporated in its entirety by reference—although other methods may also be used.

In one or more embodiments, once obtained, the estimated calibration parameters may then be provided to the parameters verifier 530. An example method embodiment that may be employed by the parameters verifier 530 is depicted in FIG. 11.

d) Parameters Verifier Embodiments

Figure 11:
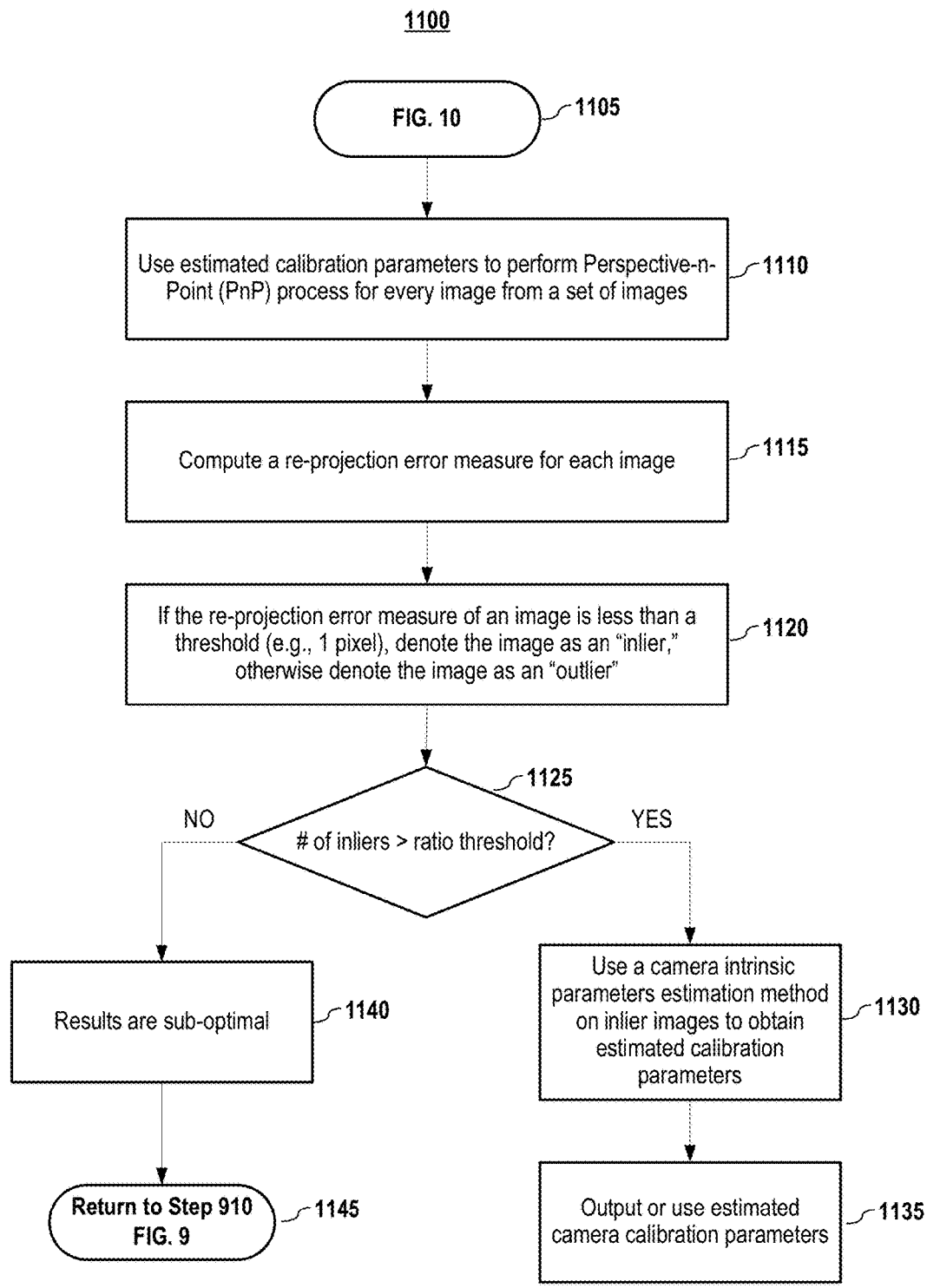
FIG. 11 depicts a method which may be performed, at least in part, by a parameters verifier, according to embodiments of the present document.

FIG. 11 depicts a method which may be performed, at least in part, by a parameters verifier, according to embodiments of the present document. In one or more embodiments, the estimated calibration parameters are used (1110) to perform a Perspective-n-Point (PnP) process for images from a set of verification images—although other methods may also be used. In one or more embodiments, the set of verification images may be all the captured images or may be a subset thereof. Then, a re-projection error measure is computed (1115) for each verification image. In one or more embodiments, the re-projection error may be an average (mean, median, or mode) error for the re-projected feature points in the image. In one or more embodiments, if the re-projection error measure of an image is less than an error threshold (e.g., 1 pixel), the image is denoted (1120) as an "inlier," otherwise the image is denoted (1120) as an "outlier."

If the number of inlier images is greater than a first inlier threshold value (e.g., 90%), the inlier images may be used to compute the camera intrinsic parameters, which are output (1135) as the final parameters. Alternatively, in one or more embodiments, if the ratio is sufficiently high (e.g., greater than or equal to a second inlier threshold value of 99%), the original camera intrinsic parameters (which included the inlier images) (1130) may be output (1135) as the final camera intrinsic parameters.

Figure 12:
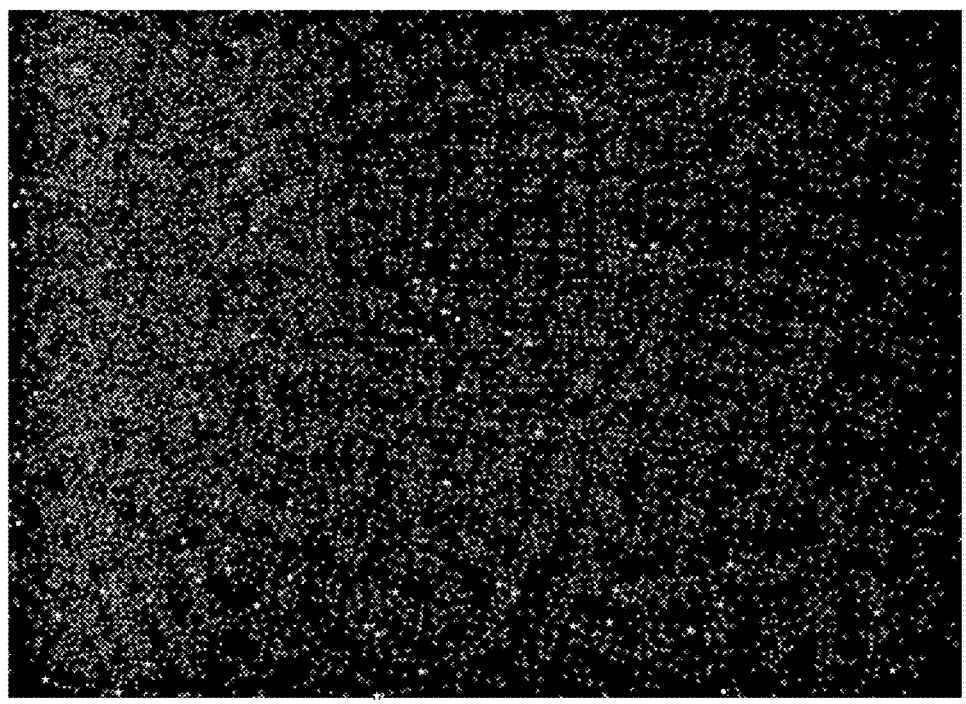
FIG. 12 depicts the overall coverage of the re-projected detected points from captured images along with the re-projected errors, according to embodiments of the present disclosure.

FIG. 12 depicts the overall coverage and error of the re-projected detected points from captured images, according to embodiments of the present disclosure. In one or more embodiments, the more points represent better coverage. Also, in embodiment, each point in the image 1200 may be assigned an indicator, such as shape or color, to indicate its re-projection error. For example, green points (or diamond-shaped points ◊ in the depicted image) may be points with no or very little (e.g., less than 1 pixel) re-projection error, yellow points (or star-shaped points in the depicted image) may be points with moderate re-projection error (e.g., between 1 to 2 pixels), and red points (or circle-shaped points in the depicted image) may be points with error above a threshold (e.g., above 2 pixels). In one or more embodiments, this image 1200 may be displayed to a user via the camera display and/or computing device display to help illustrate error rates and locations. Ideally, all (or a vast majority) of the points should have re-projection errors less than a threshold (e.g., 1 pixel).

If the number of inlier images is not greater than a ratio threshold, the results may be deemed as "sub-optimal" and the process may be repeated by returning (1145) to the step of selecting a subset of captured images (i.e., returning to Step 910 of FIG. 9). By selecting a new subset of captured images, a better sampling of images may be selected that produces a more accurate estimate of the camera's intrinsic parameters.

In one or more embodiments, if random selection cannot generate a satisfactory result after a number of attempts (e.g., 100), the dataset of captured images may be deemed insufficient for calibration, a "failure" notice may be sent to the user.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A non-transitory computer-readable medium or media comprising one or more sequences of instructions which, when executed by one or more processors, causes steps for performing intrinsic parameter calibration of a camera comprising:
   capturing a set of captured images of a calibration target, the calibration target comprising a set of unique calibration markers and is positioned so that the camera captures a view of at least a portion of the calibration target in an image frame of the camera;
   dividing the image frame of the camera into regions;
   for each captured image of the set of captured images, detecting one or more features of one or more calibration markers of the calibration target that are viewable in the captured image;
   counting a number of detected features for each region of the image frame; and
   responsive to the regions containing a number of detected features above a detected features threshold:
      selecting images from the set of captured images to form a set of selected images;
      responsive to the set of selected images having detected features at or above a detected features threshold for each region of the image frame, selecting a subset of detected features to determine an estimate of intrinsic calibration parameters of the camera;
      using the subset of detected features to estimate the intrinsic calibration parameters of the camera;

re-projecting feature points of images from a set of verification images to verify the estimated intrinsic calibration parameters of the camera;

computing a re-projecting error for the re-projected feature points for each image from the set of verification images;

responsive to the re-projection error of an image being less than an error threshold, denoting the image as an inlier, otherwise denoting the image as an outlier; and responsive to the number of inlier images being greater than a first inlier threshold value, using the inliers to compute the intrinsic calibration parameters as final intrinsic calibration parameters for the camera.

2. The non-transitory computer-readable medium or media of claim 1 further comprising one or more sequences of instructions which, when executed by one or more processors, causes steps comprising:

responsive to the number of inlier images not being greater than a first inlier threshold value, returning to the step of selecting images from the set of captured images to form a set of selected images in order to supplement the set of selected images or to select a new set of selected images.

3. The non-transitory computer-readable medium or media of claim 1 wherein the step of responsive to the number of inlier images being greater than a first inlier threshold value, using the inliers to compute the intrinsic calibration parameters as final intrinsic calibration parameters for the camera comprises:

outputting the estimated intrinsic calibration parameters of the camera as the final intrinsic calibration parameters for the camera responsive to the number of inlier images being greater than a second inlier threshold value that is higher than the first inlier threshold value.

4. The non-transitory computer-readable medium or media of claim 1 further comprising one or more sequences of instructions which, when executed by one or more processors, causes steps comprising:

responsive to not obtaining final intrinsic calibration parameters for the camera after a number of attempts, deeming the set of captured images insufficient for calibration.

5. The non-transitory computer-readable medium or media of claim 1 further comprising one or more sequences of instructions which, when executed by one or more processors, causes steps comprising:

responsive to one or more of the regions not containing a number of detected features above a detected features threshold, providing a prompt that a particular region or regions requires additional detected features.

6. The non-transitory computer-readable medium or media of claim 5 wherein the prompt comprises a real-time view of what the camera is viewing plus an overlay that highlights the one or more regions that do not contain a number of detected features above the detected features threshold.

7. The non-transitory computer-readable medium or media of claim 5 wherein at least some of the regions are assigned a unique identifier and wherein the prompt identifies a region by its unique identifier.

8. The non-transitory computer-readable medium or media of claim 5 wherein the prompt indicates how many more detected features are required for each of the one or more regions that do not contain a number of detected features above the detected features threshold.

9. The non-transitory computer-readable medium or media of claim 1 wherein the regions are not uniformly sized, and wherein the image frame is divided with more regions in areas of the image frame that more accuracy for the camera calibration is wanted.

10. The non-transitory computer-readable medium or media of claim 1 further comprising one or more sequences of instructions which, when executed by one or more processors, causes steps comprising:

responsive to a gap between a boundary of the image frame and a detected feature closest to the boundary being below a maximum gap limit, a gap between two detected features that are closest to each other being below the maximum gap limit, or both, prompting to capture more feature points in a region or regions comprising the gap or gaps.

11. A processor-implemented method for performing intrinsic parameter calibration of a camera comprising:

capturing a set of captured images of a calibration target, the calibration target comprising a set of unique calibration markers and is positioned so that the camera captures a view of at least a portion of the calibration target in an image frame of the camera;

dividing the image frame of the camera into regions;

for each captured image of the set of captured images, detecting one or more features of one or more calibration markers of the calibration target that are viewable in the captured image;

counting a number of detected features for each region of the image frame; and responsive to the regions containing a number of detected features above a detected features threshold:

selecting images from the set of captured images to form a set of selected images;

responsive to the set of selected images having detected features at or above a detected features threshold for each region of the image frame, selecting a subset of detected features to determine an estimate of intrinsic calibration parameters of the camera;

using the subset of detected features to estimate the intrinsic calibration parameters of the camera;

re-projecting feature points of images from a set of verification images to verify the estimated intrinsic calibration parameters of the camera;

computing a re-projecting error for the re-projected feature points for each image from the set of verification images;

responsive to the re-projection error of an image being less than an error threshold, denoting the image as an inlier, otherwise denoting the image as an outlier; and responsive to the number of inlier images being greater than a first inlier threshold value, using the inliers to compute the intrinsic calibration parameters as final intrinsic calibration parameters for the camera.

12. The processor-implemented method of claim 11 further comprising the step of:

responsive to the number of inlier images not being greater than a first inlier threshold value, returning to the step of selecting images from the set of captured images to form a set of selected images in order to supplement the set of selected images or to select a new set of selected images.

13. The processor-implemented method of claim 11 wherein the step of responsive to the number of inlier images being greater than a first inlier threshold value, using the inliers to compute the intrinsic calibration parameters as final intrinsic calibration parameters for the camera comprises:
  outputting the estimated intrinsic calibration parameters of the camera as the final intrinsic calibration parameters for the camera responsive to the number of inlier images being greater than a second inlier threshold value that is higher than the first inlier threshold value.

14. The processor-implemented method of claim 11 further comprising the step of:
  responsive to not obtaining final intrinsic calibration parameters for the camera after a number of attempts, deeming the set of captured images insufficient for calibration.

15. The processor-implemented method of claim 11 further comprising the step of:
  responsive to one or more of the regions not containing a number of detected features above a detected features threshold, providing a prompt that a particular region or regions requires additional detected features.

16. A camera system comprising:
  an imaging system for capturing an image of a calibration target, the calibration target comprising a set of unique calibration makers;
  one or more processors; and
  a non-transitory computer-readable medium or media comprising one or more sequences of instructions which, when executed by at least one of the one or more processors, causes steps for performing intrinsic parameter calibration of a camera comprising:
    capturing a set of captured images of a calibration target, the calibration target comprising a set of unique calibration markers and is positioned so that the camera captures a view of at least a portion of the calibration target in an image frame of the camera;
    dividing the image frame of the camera into regions;
    for each captured image of the set of captured images, detecting one or more features of one or more calibration markers of the calibration target that are viewable in the captured image;
    counting a number of detected features for each region of the image frame; and
    responsive to the regions containing a number of detected features above a detected features threshold:
      selecting images from the set of captured images to form a set of selected images;
      responsive to the set of selected images having detected features at or above a detected features threshold for each region of the image frame, selecting a subset of detected features to determine an estimate of intrinsic calibration parameters of the camera;
      using the subset of detected features to estimate the intrinsic calibration parameters of the camera;
      re-projecting feature points of images from a set of verification images to verify the estimated intrinsic calibration parameters of the camera;
      computing a re-projecting error for the re-projected feature points for each image from the set of verification images;
      responsive to the re-projection error of an image being less than an error threshold, denoting the image as an inlier, otherwise denoting the image as an outlier; and
      responsive to the number of inlier images being greater than a first inlier threshold value, using the inliers to compute the intrinsic calibration parameters as final intrinsic calibration parameters for the camera.

17. The camera system of claim 16 wherein the non-transitory computer-readable medium or media further comprises one or more sequences of instructions which, when executed by one or more processors, causes steps comprising:
  responsive to the number of inlier images not being greater than a first inlier threshold value, returning to the step of selecting images from the set of captured images to form a set of selected images in order to supplement the set of selected images or to select a new set of selected images.

18. The camera system of claim 16 wherein the step of responsive to the number of inlier images being greater than a first inlier threshold value, using the inliers to compute the intrinsic calibration parameters as final intrinsic calibration parameters for the camera comprises:
  outputting the estimated intrinsic calibration parameters of the camera as the final intrinsic calibration parameters for the camera responsive to the number of inlier images being greater than a second inlier threshold value that is higher than the first inlier threshold value.

19. The camera system of claim 16 wherein the non-transitory computer-readable medium or media further comprises one or more sequences of instructions which, when executed by one or more processors, causes steps comprising:
  responsive to not obtaining final intrinsic calibration parameters for the camera after a number of attempts, deeming the set of captured images insufficient for calibration.

20. The camera system of claim 16 wherein the non-transitory computer-readable medium or media further comprises one or more sequences of instructions which, when executed by one or more processors, causes steps comprising:
  responsive to one or more of the regions not containing a number of detected features above a detected features threshold, providing a prompt that a particular region or regions requires additional detected features.

* * * * *